Sept. 22, 1964  R. R. BURKHALTER ETAL  3,149,505
TRANSFER CASE GEARING
Filed Dec. 28, 1959  2 Sheets-Sheet 1
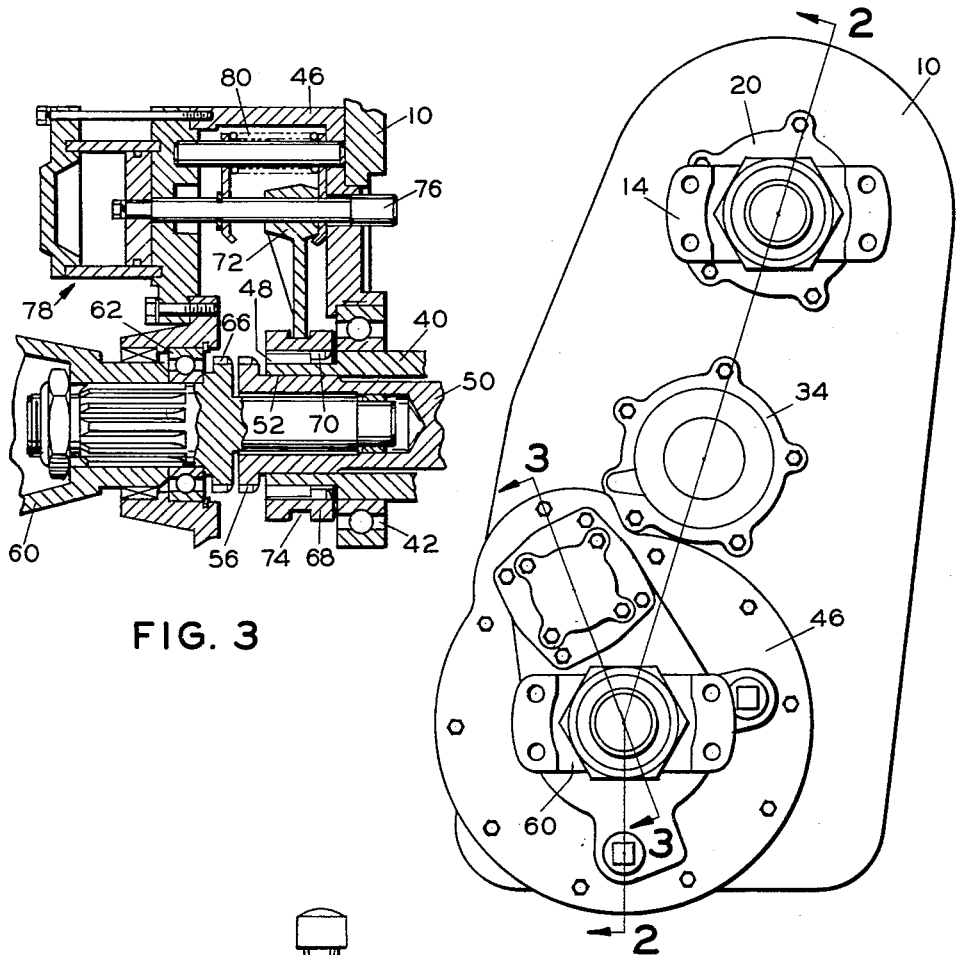
FIG. 3
FIG. 1
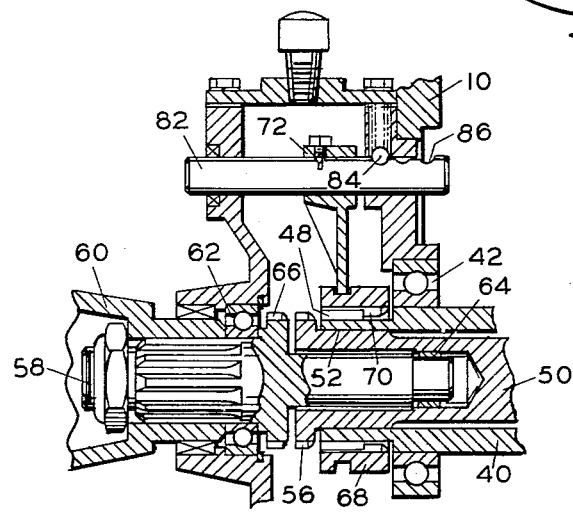
FIG. 4
*INVENTORS*
ROBERT R. BURKHALTER
ROBERT E. FLETCHER
BY Walter E. Pavlick
ATTORNEY INVENTORS
ROBERT R. BURKHALTER
ROBERT E. FLETCHER
BY Walter E. Pavlick

ATTORNEY

United States Patent Office 3,149,505
Patented Sept. 22, 1964

3,149,505
TRANSFER CASE GEARING
Robert R. Burkhalter and Robert E. Fletcher, Toledo, Ohio, assignors to Dana Corporation, Toledo, Ohio, a corporation of Virginia
Filed Dec. 28, 1959, Ser. No. 862,193
2 Claims. (Cl. 74—665)

This invention relates to improvements in transfer case gearing arrangements for four-wheel drive motor vehicles in general and more particularly to a coupling arrangement wherein a pair of output shafts are selectively coupled to an input shaft to render a pair or all four wheels operative or inoperative, as desired.

The primary object of this invention is to provide a structure having a pair of output shafts so arranged that power coming from a main change speed gear box of a motor vehicle is readily applied to both the front and rear axles of a vehicle, or only to one of the axles, or neutralized from both axles by means of one coupling device. Further, the construction and arrangement of the output shafts results in an extremely compact unit shorter in axial length than has heretofore been known.

A further object of this invention is to provide a mechanism suitable for converting a two-wheel drive vehicle to a four-wheel drive vehicle which mechanism is simple in construction, efficient in operation, inexpensive to assemble and manufacture.

Further objects and advantages will become apparent upon reading the following specification together with the accompanying drawings which form a part hereof.

In the drawings:

FIG. 1 is an end elevation of the transfer case gearing disclosing this invention;

FIG. 3 is a sectional view taken substantially along line 3—3 of FIG. 1 showing power operated means for controlling the shiftable element, and FIG. 4 is a sectional view similar to FIG. 3 illustrating manually operated means for controlling the shiftable element.

Figure 2:
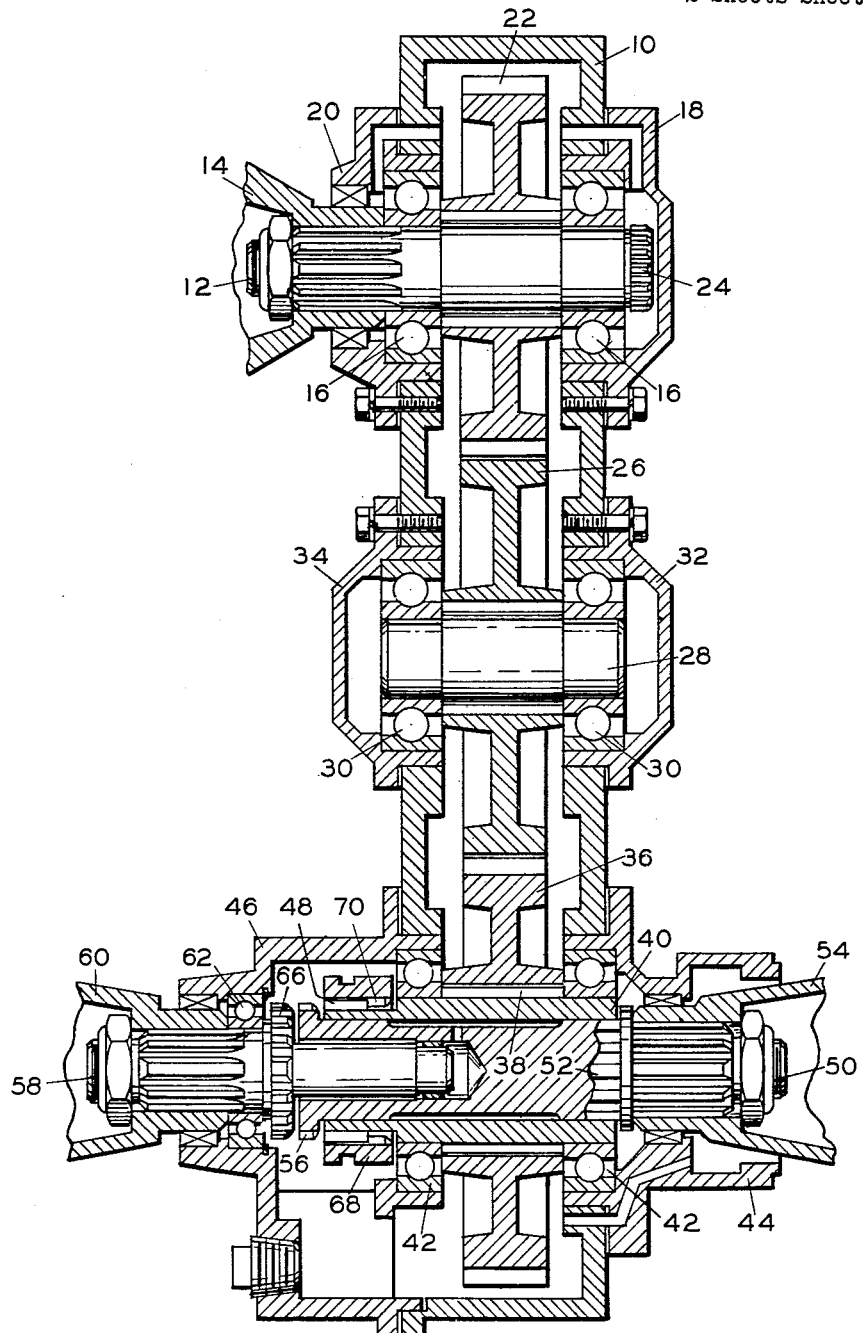
FIG. 2 is a longitudinal sectional view taken substantially along line 2—2 of FIG. 1.

Many constructions and arrangements of transfer case gearings used in connection with motor vehicles, such as trucks and tractors, have been previously employed. In these prior arrangements, transfer case means or mechanisms have included separate means for connecting the front and rear drive axles to a driving means. This arrangement materially increases the overall axial length of the transfer case gearing mechanism and substantially adds to the length of the vehicle wheelbase. This increased length is detrimental to the truck manufacturer in his effort to obtain a four-wheel drive vehicle having an extremely short wheelbase, such as required in vehicles of the military type.

The mechanism, as hereinafter described, has an arrangement of gearing and output shafts wherein only one shiftable element is required to control the engagement or disengagement of the front and rear drive axles. This construction substantially reduces the overall axial length of a transfer case.

The transfer case gearing as here shown comprises, more specifically, an input shaft, a pair of output shafts and a gear train between the input and output shafts. The gear train includes an element, such as a clutch, shiftable into and out of operative or motion transmitting position. This shiftable element has three positions and is shiftable in one direction only from its inoperative or neutral position. In its first shifted position from neutral, power is applied to the rear drive axle only and in its second shifted position from neutral, power is applied to both front and rear drive axles. When the shiftable element or clutch is in its neutral position a power take-off can be used while the vehicle is stationary.

Referring now to the drawings and particularly to FIG. 2, a transfer gear casing 10 housing a power input shaft 12 is adapted to be connected by a universal coupling 14 to a primary change speed gear unit (not shown) for receiving drive torque therefrom.

The input shaft 12 is journaled in bearings 16 which are retained in the casing 10 by a bearing cap 18 and a bearing retainer 20. An input gear 22 is splined or otherwise fixedly secured to the input shaft 12 for unitary rotation therewith. Further, the input shaft 12 is provided with coupling teeth 24 at one of its ends, the purpose of which will be described hereinafter.

An intermediate gear 26 is mounted on a shaft 28 and constantly meshes with the input gear 22. The shaft 28 is journaled in bearings 30 which are retained in the casing 10 by bearing caps 32 and 34. This arrangement permits the shaft 28 and gear 26 to rotate as a unit relative to the casing 10.

An output gear 36 is splined as at 38, to a sleeve shaft 40 for unitary rotation therewith. The sleeve shaft 40 is journaled in bearings 42 which are retained in such a position in the casing 10 by bearing retainers 44 and 46 that the output gear 36 is constantly in mesh with the intermediate gear 26. A portion of the sleeve shaft 40 extends axially outwardly beyond one of the bearings 42 and is provided with coupling teeth 48 on the outer periphery thereof, the purpose of which will appear hereinafter.

A rear output shaft 50 is telescopically mounted in the sleeve shaft 40 and is rotatable relative thereto on fluted bearing surfaces 52 provided on the shaft 50. This shaft 50 is adapted to be connected to a rear drive axle (not shown) by a universal coupling 54 for imparting drive torque thereto. The other end of the output shaft 50 is provided with an enlarged hub having coupling teeth 56 on the outer surface thereof and an internal pilot bushing 64 for a front output shaft 58.

The front output shaft 58 is adapted to be connected by a universal coupling 60 to a front drive axle (not shown) for imparting drive torque thereto. The front output shaft 58 is axially aligned with the rear output shaft 50 and is journaled in a bearing 62 and the bushing 64. This structure permits the front and rear output shafts to rotate relative to each other. Clutch teeth 66 are provided on an enlarged hub of front output shaft 58 adjacent to the clutch teeth 56 on the rear output shaft 50.

It should be noted that both front and rear drive output torques are obtained through the sleeve shaft 40 and a shiftable clutching element or ring 68 which is splined thereon. As shown in FIG. 2, the clutch element 68 is in its neutral or disengaged position thereby permitting both output shafts 50 and 58 to remain stationary while a power take-off device (not shown) is being operated from the input shaft 12 through the aforedescribed clutch teeth 24.

Shifting the clutch element 68 forward, to the left in FIG. 2, engages the external teeth 56 of the rear output shaft 50 with the internal teeth 70, which extend for substantially the full length of the clutch element 68, thereby coupling the rear output shaft 50 to the sleeve shaft 40 for unitary rotation therewith. With the transfer gearing in this position, drive torque is applied to the rear output shaft 50 from the input shaft 12.

The teeth 66 of the front output shaft 58 are so positioned with respect to the teeth 48 of the sleeve shaft 40 that a further forward shifting of the clutch element 68 will engage the teeth 66 with the internal teeth 70 of the clutch element thereby coupling the front output shaft 58 to the sleeve shaft 40 for unitary rotation therewith, while the teeth 70 still remain engaged with the teeth 56 of the rear output shaft 50. In this condition drive torque is simultaneously applied from the input shaft to both front and rear output shafts.

Referring now to FIG. 3, the clutch element 68 is adapted to be controlled by a double acting power element 78. The power element 78 comprises a piston rod 76 which, in this case, acts as a shift fixedly for mounting a shift fork 72. The shift fork 72 straddles an annular groove 74 provided in the element 68 thereby operatively connecting the clutch element 68 to the power element 78. The power element further is provided with a neutralizing spring 80 which constantly biases the power element to a central position thereby returning the clutch element 68 to a position wherein the sleeve shaft 40 is normally connected to the rear output shaft 50 in the absence of fluid pressure. Shifting the power element 78 inwardly, to the right in FIG. 3, neutralizes both output shafts. Shifting the power element 78 outwardly, to the left in FIG. 3, clutches both output shafts to the sleeve shaft 40 thereby imparting drive torque to both of the output shafts.

As shown in FIG. 4, the shift fork 72 is fastened to a shift rod 82 which is slidably mounted in the casing 10 and which is adapted to be retained in any of its shifted positions by a spring-pressed ball 84 engageable in notches 86 therein. The shift rod 82 is manually shiftable to any one of its three positions by means of a suitable shifting lever (not shown) arranged within easy reach of a vehicle operator in any well known manner.

It will be obvious that various changes in the details which have been herein described and illustrated in order to explain the nature of this invention may be made by those skilled in the art within the principle and scope of the invention as expressed in the appended claims.

What is claimed is:

1. Transfer gearing for front and rear wheel drive vehicles comprising an input shaft, a pair of output shafts, a sleeve shaft carried on one of said output shafts, a train of gears operatively connecting said input shaft and said sleeve shaft, and means including a movable element carried by said sleeve shaft and rotatable relative to said output shafts and having a neutral position and being movable in a single direction therefrom to a first and a second aligned alternate positions for selectively coupling said sleeve shaft to one of said output shafts in said first position and to both of said output shafts in said second position.

2. Transfer gearing for front and rear wheel drive vehicles comprising,
   (1) an input shaft,
   (2) a pair of axially aligned output shafts,
   (3) a sleeve shaft telescopically mounted for rotation on one of said output shafts,
   (4) gear means drivingly connecting said input shaft to said sleeve shaft,
   (5) a first clutch gear carried by said one output shaft for unitary rotation therewith,
   (6) a second clutch gear carried by the other output shaft for unitary rotation therewith and being axially aligned and spaced from said first clutch gear,
   (7) and a clutch ring splined on said sleeve shaft for unitary rotation therewith and axial movement relative thereto and being rotatable relative to said output shafts,
   (8) said clutch ring including clutch teeth, one end of which being operative to successively engage said first and said second clutch gears upon being shifted to two successive positions in one direction from a neutral position,
   (9) said clutch teeth being axially elongated and operative to be engaged with both said first and second clutch gears,
   (10) whereby upon being shifted axially from a neutral position said one end of said clutch teeth engages successively said first and second clutch gears to successively couple said input shaft first to said one output shaft and then to both said output shafts.

References Cited in the file of this patent

UNITED STATES PATENTS

| | | |
|---|---|---|
| 1,258,883 | Farmer | Mar. 12, 1918 |
| 2,231,144 | Wagner | Feb. 11, 1941 |
| 2,354,300 | Bock | July 25, 1944 |
| 2,431,727 | Bennett | Dec. 2, 1947 |
| 2,601,297 | Keese | June 24, 1952 |
| 2,674,136 | Bryan | Apr. 6, 1954 |
| 2,835,143 | Kelbel | May 20, 1958 |
| 2,851,115 | Buckendale | Sept. 9, 1958 |

FOREIGN PATENTS

| | | |
|---|---|---|
| 1,110,867 | France | Oct. 19, 1955 |

UNITED STATES PATENT OFFICE
CERTIFICATE OF CORRECTION

Patent No. 3,149,505                                         September 22, 1964

Robert R. Burkhalter et al.

It is hereby certified that error appears in the above numbered patent requiring correction and that the said Letters Patent should read as corrected below.

Column 3, line 8, for "shift fixedly for mounting" read -- shift rod fixedly mounting --.

Signed and sealed this 12th day of January 1965.

(SEAL)
Attest:

ERNEST W. SWIDER                                              EDWARD J. BRENNER
Attesting Officer                                                 Commissioner of Patents